UNITED STATES PATENT OFFICE.

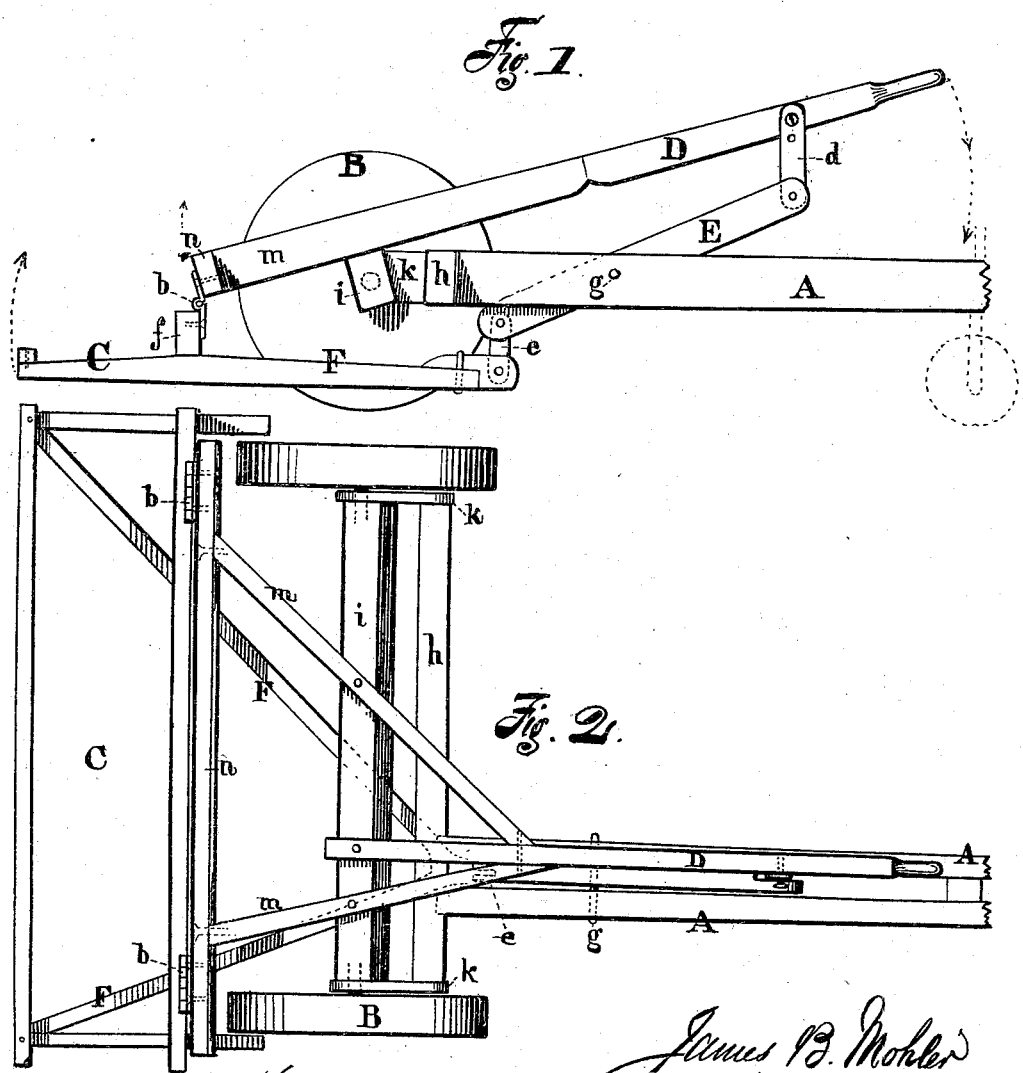

JAMES B. MOHLER, OF PEKIN, ASSIGNOR OF ONE-HALF HIS RIGHT TO ANDREW J. HODGES, OF PEORIA, ILLINOIS.

IMPROVEMENT IN HARVESTERS.

Specification forming part of Letters Patent No. 172,145, dated January 11, 1876; application filed October 4, 1875.

*To all whom it may concern:*

Be it known that I, JAMES B. MOHLER, of the city of Pekin, in the county of Tazewell, in the State of Illinois, have invented an Improvement in Harvesting-Machines; and do hereby declare that the following is a full, clear, and exact description thereof, reference being had to the annexed drawings, making a part of this specification, in which like letters of reference refer to like parts, and in which—

Figure 1 represents a longitudinal elevation; Fig. 2, a plan.

The object of this invention is an improvement in the mechanism used to preserve the horizontality of the cutting-platform of a harvesting-machine at all levels in raising or lowering the same, according to the state of the grain to be cut at any point between standing and lodged.

The front end of the lever, as has been heretofore done, is hinged to the reaping-platform, the rear end of said lever being linked or jointed to the rear end of a shorter lever (in the same line beneath it) pivoted to the frame of the harvester, behind the platform. The front end of the latter lever is, in turn, linked or jointed to a horizontal brace or braces rigidly fixed to and beneath the reaping-platform. The upper or first-mentioned lever is fixed to and moves upon the wheel-axle as a pivot or fulcrum, so that the compound action of the two levers constantly preserves the horizontality of the reaping-platform, whether the latter is depressed to the ground or raised to the highest limits required in reaping.

In the drawings, which represent one of the forms in which I construct my invention, A represents the frame of a harvester or header; $h$, the front cross-bar, which supports the same by side extensions or castings $k\ k$ next the wheels, which are centered or pivoted upon the axles of said wheels; B, the wheels; C, the reaping-platform; D, the lever which manages the latter. It is pivoted upon the axle $i$, and is extended, by braces $m\ m$, to a horizontal cross-beam, $n$, over the rear end of the reaping-platform, which beam is hinged or jointed at $b$ to said platform, or, rather, to a transverse beam or bar, $f$, parallel to said terminal beam $n$, fixed across the platform. The rear end of said lever D is connected, by a link, $d$, with the lever E beneath it. This latter lever is pivoted, at $g$, between the bars of the frame A, near the forward end of said lever. This end is again linked, at $e$, to the rear point of the reaping-platform, or, rather, to its attached V-shaped brace or braces F F below it, which extend forward diagonally to the opposite front corners of said platform, and to which they are rigidly fixed.

The lever D may be pivoted or hinged to the front bar $h$ of the frame A with equal effect to that of its position upon the axle $i$.

The operation of this invention is as follows: The combined action of the two levers D E in raising or lowering the reaping-platform constantly preserves the horizontality of the latter, obviating at once the awkward slope of the platform in the old harvesters and the consequent difficulty of getting the grain up the same, and avoiding the danger of running the sickle-bar fingers into the ground.

What I claim as my invention is—

1. The combination, with the platform C and the lever D of the same, hinged together by the hinge or joint $b$, of the brace F, link $e$, lever E, and link or joint $d$, substantially as and for the purposes described.

2. The combination and arrangement of the platform C, (when provided with the braces F,) link $e$, lever E, with its pivot $g$, link $d$, lever D, with the attached axle $i$, and hinge $b$, constructed and operating substantially as and for the purposes described.

3. The lever E, pivoted at $g$ to the harvester-frame A, and connected, by a joint or link, $e$, at its forward end, to the platform C, and at the rear end, by a similar joint or link, $d$, to the lever D, substantially as and for the purposes described.

In testimony that I claim the foregoing improvement in harvesters I have hereunto set my hand this 20th day of August, 1875.

JAMES B. MOHLER.

Witnesses:
   H. P. WILBER,
   A. B. SAWYER.